United States Patent [19]
Glowinsky et al.

[11] 4,412,324
[45] Oct. 25, 1983

[54] BIT-BY-BIT TIME-DIVISION SWITCHING NETWORK

[75] Inventors: Albert Glowinsky, Clamart; Pierre M. Lucas, Issy-Les-Moulineaux, both of France

[73] Assignee: Etat Francais, Issy-Les Moulineaux, France

[21] Appl. No.: 264,813

[22] Filed: May 18, 1981

[30] Foreign Application Priority Data

May 23, 1980 [FR] France ................. 80 11549

[51] Int. Cl.³ .................. H04J 6/00; H04Q 11/04
[52] U.S. Cl. ........................ 370/58; 370/67; 370/80
[58] Field of Search ........... 370/44, 60, 67, 80, 370/84, 92, 118, 94

[56] References Cited

U.S. PATENT DOCUMENTS

4,258,434  3/1981  Glowinski et al. ............ 370/60
4,335,456  6/1982  Gaiser et al. .................. 370/60

*Primary Examiner*—Gerald L. Brigance
*Attorney, Agent, or Firm*—Lowe, King, Price & Becker

[57] ABSTRACT

A bit-by-bit time-division digital switching network switches incoming and outgoing isochronous digital channels having rates which are different but sub-multiples of a given low rate. After phasing the incoming channels, bits having a predetermined binary state are detected. Previously stored addressed words of the outgoing channels to be switched to the incoming channels are read out and multiplexed into an intermediate multiplex highway in response incoming channel bits having the predetermined state. This predetermined state is respectively that of the received bit, or its inverse if the sum of the incoming channel word bits is respectively less than, or greater than half the number of incoming word bits. Each multiplex highway multiframe is composed of a number of outgoing channel address words equal at most to half the number of incoming channels. A frame or certain parts of the multiframe in the multiplex highway indicate, by the presence or the absence of the outgoing channel address word, whether or not the incoming channel word bits have been inverted.

8 Claims, 11 Drawing Figures

BIT-BY-BIT TIME-DIVISION SWITCHING NETWORK

BACKGROUND OF THE INVENTION

1. Field of the Invention

The present invention relates to an improved bit-by-bit time-division digital switching network as described in U.S. Pat. No. 4,258,434.

2. Description of the Prior Art

According to the invention, a prior art bit-by-bit switching principle for single or component incoming channels which are multiplexed into incoming multiplex channels is retained. This principle relates chiefly to the correspondence of a predetermined-state bit in an incoming channel with the transmission of an outgoing channel address along an intermediate multiplex digital highway between the receiving part and the transmission part. At the transmission part, detection of the outgoing channel address word generates a bit in the predetermined state, and the absence of this detection generates a bit in the inverse state. These criteria apply for each recurrent frame of the multiple highway which transmits, by means of outgoing channels, address words the implicit binary state of same-rank bits in incoming channel words having a given number of bits. The means common to the switching networks in the present invention and in U.S. Pat. No. 4,258,434 are the following:

means for phasing the incoming digital channels;

means for storing bits having the same rank in the phased incoming channel data words;

means for detecting stored same rank bits having a predetermined binary state;

means for storing address words of the outgoing digital channels to be switched to the incoming digital channels;

means controlled by the predetermined binary state bit detecting means for reading stored outgoing channel address words corresponding to switched incoming channels with bits having the predetermined binary state and a same rank;

means for multiplexing the read outgoing channel address words into an address word multiplex digital highway at high rate;

means connected to the multiplex digital highway for detecting the address words of each outgoing digital channel; and means controlled by the address word detecting means for delivering a bit having the predetermined binary state or the other binary state into said rank of a data word of the outgoing digital channel in response to the detection or failure of the detection of the address word of said outgoing digital channel.

In accordance with the U.S. Pat. No. 4,258,434, the number of address words which are conveyed in a recurrent frame of the intermediate multiplex highway is statistically equal at the most to half the number of incoming channels. If all the same rank bits of the words (or groups of bits) in the incoming channels are in the predetermined binary state, the highway frame is entirely filled with address words, equal in number to the number of incoming channels. If all the same rank bits of incoming channel words (or groups of bits) are in the other binary state, the highway frame does not contain any address words. Consequently, the sum of so-called free intervals which are available and adaptable for transmission of additional information (such as supervisory words); and which are included in the ends of frames in an intermediate highway multiframe, occupies a variable time period which lies between 0 and the number of the time intervals of address words which are capable of being transmitted in this multiframe.

OBJECTS OF THE INVENTION

The main object of the invention is to provide a time-division digital switching network of the type defined in U.S. Pat. No. 4,258,434 wherein the number of address words in a multiplex highway multiframe is strictly less than half the number of incoming channels to be switched, or a number substantially higher than the latter. It stems from this that, for a determined number of incoming channels to be switched and for practically equal outgoing multiplex digital channel bit-rates, the interval available for transmitting additional information in a multiframe as per the invention can be equivalent to a number of address words strictly greater than half the number of incoming channels.

In comparison with U.S. Pat. No. 4,258,434, and in the event of the address words and the framing words being "packed" at the start of a multiframe, i.e. where the intervals available for additional information are adjacent the end of the multiplex highway multiframe, another object of this invention is to provide a number of switched channels which can be greater for a given digital rate of the intermediate multiplex highway, i.e. for a given technology that imposes a limit on the maximum transmission speed. As a corollary to this, for a given number of switched channels, the intermediate multiplex highway digital rate can be reduced.

SUMMARY OF THE INVENTION

In accordance with the invention, a time-division digital switching network for switching a plurality of incoming and outgoing isochronous digital data channels transmitting data words consisting of a given even or odd number of bits and having rates which are different but submultiples of a given low rate comprises means for phasing said incoming digital channels. Means connected to the phasing means adds the bits of each data word of each phased incoming channel into a sum to produce an additional bit having first and second binary states when the sum is respectively no greater and greater than half of the given bit number. First switching means controlled by the adding means selectively inverts or does not invert the bits of the data word of said phased incoming channel in response to the state of the additional bit. Means controlled by the adding means derives inversion indicating words, each indicating whether the bit states of each incoming channel word have or have not been inverted. The bits having the same rank in said phased incoming channel data words are stored. The stored same rank bits having a predetermined binary state are detected. Address words of the outgoing digital channels to be switched to said incoming digital channels are stored. The stored outgoing channel address words corresponding to the switched incoming channels with bits having the predetermined binary state and the same rank are read. The read outgoing channel address words and the bit inversion indicating words are multiplexed into an address word multiplex digital highway at high rate. The address words of each outgoing digital channel of the multiplex digital highway are detected. A bit having the first and second binary states is supplied to the rank of a data word of said outgoing digital channel in response to the address word of said outgoing digital channel being detected and not detected, respectively. The inversion indicating words for the incoming digital channel words corresponding to each outgoing digital channel are detected to restore said additional bits. In response to detection or failure to detect an indicating word, uninverted and inverted replicas of the bits of each data word are transmitted to the outgoing digital channel in response to the binary state of the additional bit corresponding to the data word.

To fix ideas, if it is assumed that the predetermined state of the bits which are transmitted along incoming multiplex channel, is "1" and that P designates the sum of the state "1" bits in a word of the incoming channel, such as an octet, respectively an 11-bit word, then the number of transmitted address words of the corresponding outgoing channel is always less than or equal to four, respectively less than 5.5, and corresponds to bits in state "1" if $P \leq 4$, respectively if $P < 5.5$, and to bits in state "0" if $P > 4$, respectively if $P > 5.5$. Consequently, the proportion of bits to be transmitted implicitly on the intermediate multiplex highway is strictly—and no longer merely statistically—less than $\frac{1}{2}$. In fact, the value of $\frac{1}{2}$ can be increased by a small proportion, as seen hereinafter, because the intermediate multiplex highway must transmit information which indicates whether or not there was an inversion of the bits before transformation into address words for reconstituting the bits of the corresponding outgoing channel in the transmission part.

BRIEF DESCRIPTION OF THE DRAWING

Other advantages of the invention will be apparent from the following more particular description of preferred embodiments of the invention, as illustrated in the accompanying drawings, in which.

DESCRIPTION OF THE PREFERRED EMBODIMENTS

To describe the invention more clearly, reference is made hereinafter to the second embodiment described in U.S. Pat. No. 4,258,434. This embodiment concerns a bit-by-bit time-division digital switching network which switches digital component channels $IT_{i,h}$ (h varying from 0 to 31) which are multiplexed in incoming time-division multiplex channels $E_i$ (i varying from 0 to $2^N - 1$) and component digital channels $IT_{j,k}$ (k varying from 0 to 31) which are multiplexed in outgoing time-division multiplex channels $S_j$ (j varying from 0 to $2^N - 1$). In general, the incoming and outgoing multiplex channels are isochronous but not necessarily in phase. Each incoming or outgoing multiplex channel is a PCM channel with a binary rate of 2,048 kbits/s and arises from the time-division multiplexing of 32 component channels at the binary rate of 64 kbits/s. Each component channel occupies a time interval IT equal to 3.9 μs which corresponds to an octet in the PCM frame having a duration equal to 125 μs.

Figure 1:
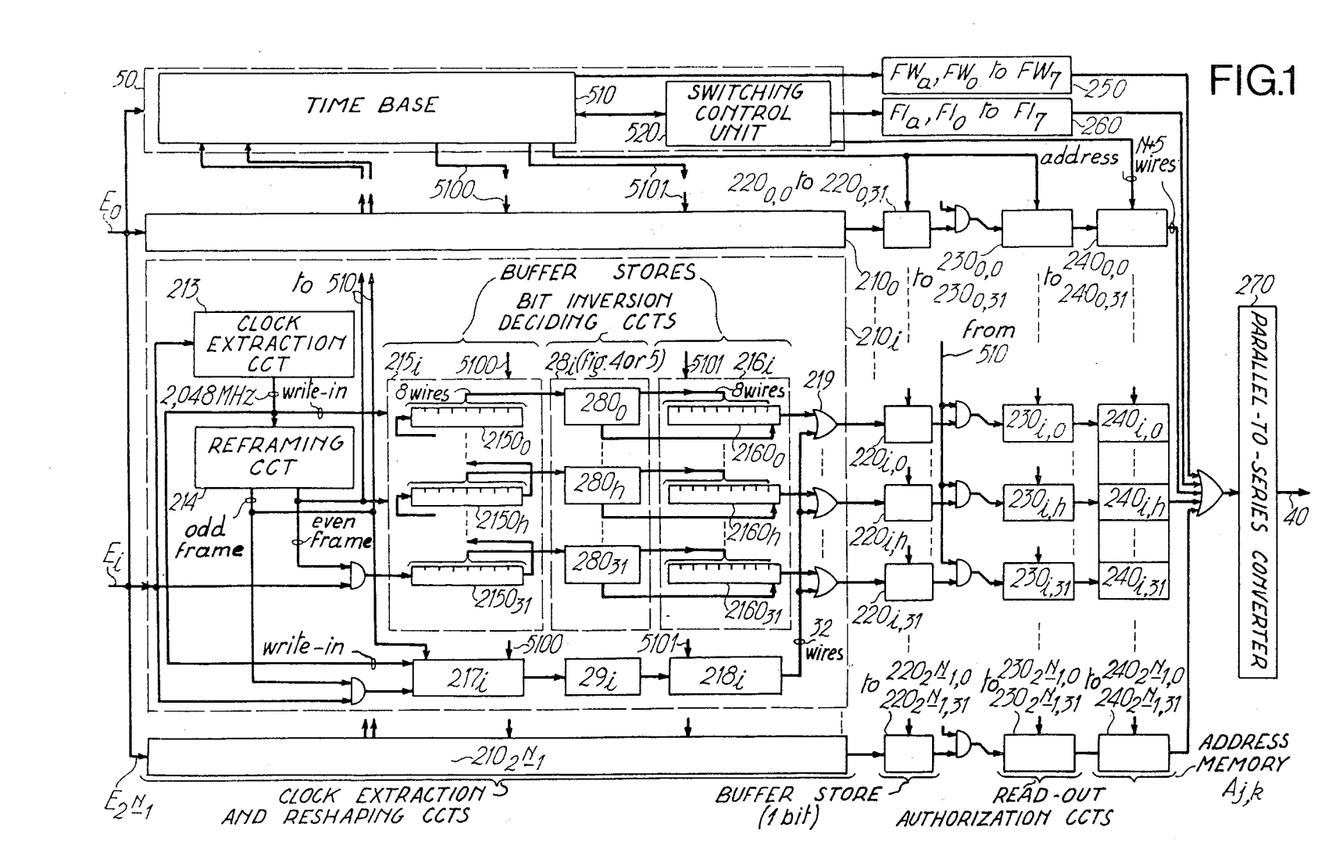
FIG. 1 is a block-diagram of the incoming channel receiving and switching part in a network for switching component digital channels of multiplex channels, in which is detailed the clock extraction and reshaping circuit of an incoming multiplex channel according to a first embodiment in which the address words corresponding to the additional bits are transmitted.
Figure 2:
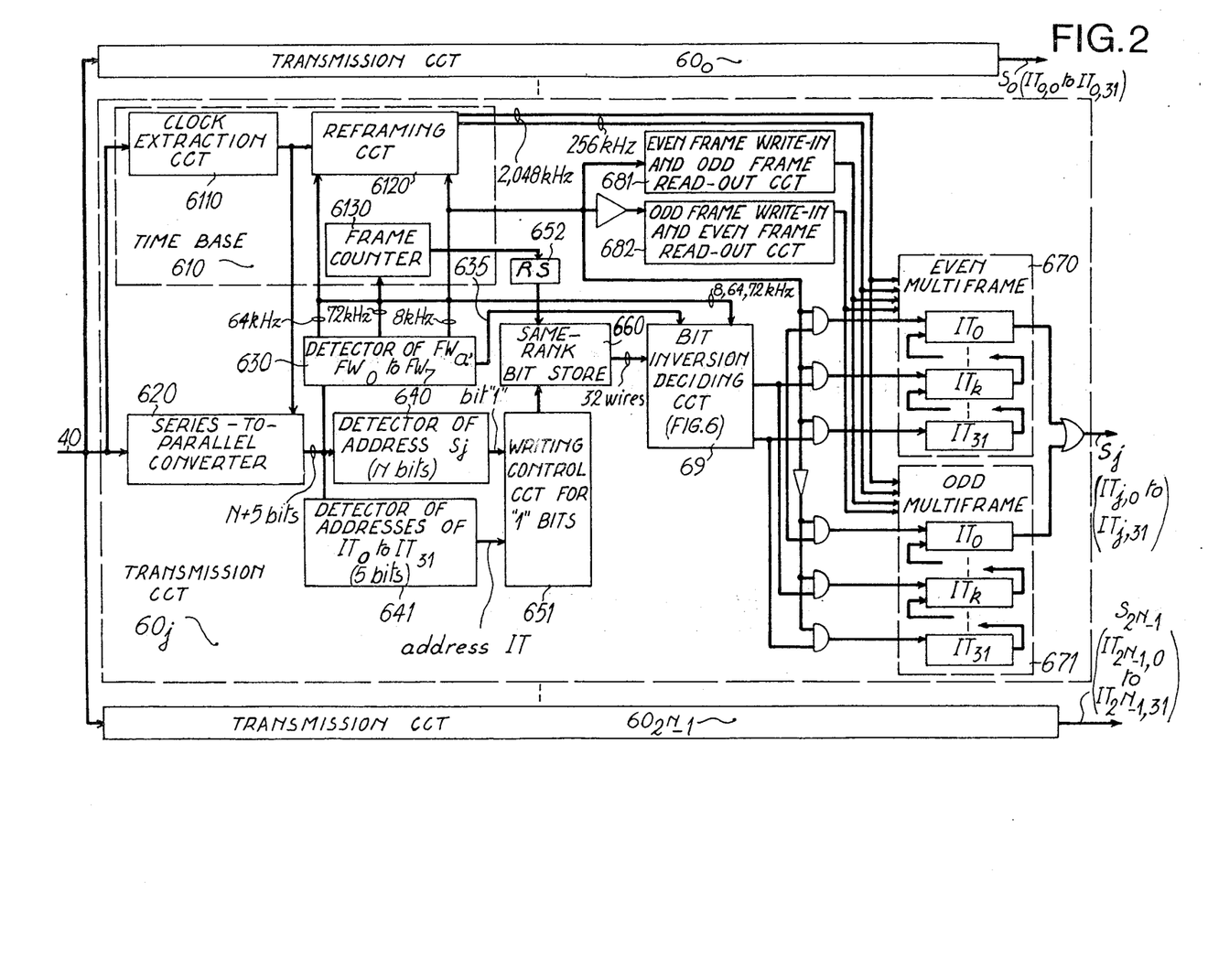
FIG. 2 is a block-diagram of the transmission circuit for a multiplex outgoing channel according to the first embodiment.

In the common receiving and switching part which is shown in FIG. 1 and in each transmission part $60_0$ to $60_{2N-1}$ associated with the respective outgoing multiplex channel $S_0$ to $S_{2N-1}$ which is shown in FIG. 2, the same functional blocks as those described for FIGS. 5, 6 and 8 in U.S. Pat. No. 4,258,434 are designated by the same reference numbers, respectively. The common receiving and switching part and the transmission parts are connected through an intermediate multiplex highway 40.

Referring first to FIG. 1, each incoming multiplex channel $E_i$ is connected to the input of a clock extraction and reshaping circuit $210_i$ which transmits in parallel the same rank bits of the thirty-two octets of component channels $IT_{i,0}$ to $IT_{i,31}$ and also thirty-two additional bits to one-bit storage cells $220_{i,0}$ to $220_{i,31}$ of a buffer store 220. The read-out of buffer store 220 under the control of a time-base 510 makes it possible to select the state "1" bits to which outgoing component channel addresses $A_{j,k}$, effectively transmitted to transmission parts $60_0$ to $60_{2N-1}$, correspond. Each bit in the state "1" read in the buffer store 220 is used, via the corresponding read-out authorization circuit $230_{0,0}$ to $230_{2N-1,31}$, to authorize the read-out of the address $A_{j,k}$ contained in the corresponding storage cell $240_{0,0}$ to $240_{2N-1,31}$ of a read-and-write address memory 240. Each cell of the memory 240 contains one of the addresses $A_{j,k}$ of the outgoing component channels $IT_{j,k}$ which designates the outgoing component channel to be connected to the corresponding incoming component channel. The addresses $A_{j,k}$ are written in the memory 240 under the control of a switching control unit 520 which modifies the content of the memory 240 in response to the supervision words which are detected on the incoming multiplex PCM channels $E_i$. The common receiving part also comprises a read-only memory 250 which contains the nine framing words $FW_a$, and $FW_0$ to $FW_7$ of the frames in the intermediate multiplex highway 40, and a read-and-write memory 260 containing supervision words which are inserted in the address freed intervals $FI_a$, and $FI_0$ to $FI_7$ of the frames. The memories 240, 250 and 260 thus deliver address words, framing words and supervisory words onto the intermediate multiplex highway 40, generally through a parallel-to-series converter 270. As shown in FIG. 1, only the clock extraction and reshaping circuits differ from those in the aforementioned U.S. patent. An exemplary clock extraction and reshaping circuit 210 is illustrated in FIG. 1 and described below in detail, the others being identical. As regards the detailed working of the other blocks and their interconnections, reference is made to the aforesaid U.S. patent.

A clock extraction and reshaping circuit $210_i$ is adapted to phase the incoming PCM channel $E_i$ with the local time base 510 and to rearrange the component channels $IT_{i,0}$ to $IT_{i,31}$ so that each incoming component channel simultaneously presents a bit having the same rank, for the purpose of bit-by-bit switching. The circuit $210_i$ comprises a clock extraction circuit 213 which extracts the clock signal having a frequency of 2.048 MHz, as transmitted on the incoming channel $E_i$, and a reframing circuit 214 which detects the framing words of the recurrent PCM frames which are at a frequency of 8 MHz, i.e. at the sampling frequency of the component channels $IT_{i,h}$. The circuit $210_i$ also contains pairs of buffer stores $215_i$–$216_i$ and $217_i$–$218_i$, each of which is adapted to process successive odd and even PCM incoming frames. Each first buffer store $215_i$, $217_i$ has outputs which are connected to the inputs of the second associated buffer store $216_i$, $218_i$ through a bit inversion bit deciding circuit $28_i$, $29_i$. The PCM incoming frames are separated in order to rearrange the bits of an even frame so they have a rhythm which is a multiple of the binary rate of the intermediate multiplex highway 40, i.e. at the same rhythm as the local time base 510. While the even frame bits are rearranged an odd frame is simultaneously written, and vice versa. Each pair of buffer stores $215_i$–$216_i$ or $217_i$–$218_i$ therefore stores a frame during an interval of $2 \times 125\ \mu s = 250\ \mu s$. Since the buffer store pairs $215_i$–$216_i$, $217_i$–$218_i$ are identical, only the buffer stores $215_i$ and $216_i$ and the bit inversion deciding circuit $28_i$ assigned to the even frames are illustrated in detail in FIG. 1.

The buffer store $215_i$ comprises thirty-two 8-bit shift registers $2150_0$ to $2150_{31}$ which, under the control of the reframing circuit 214 in response to the detection of a framing word for an even frame, are connected in series with the input $E_i$ in the order of decreasing subscripts h, i.e. $2150_{31}$ to $2150_0$. During this PCM frame period, the buffer store $215_i$ thus constitutes a single shift register which comprises $32 \times 8 = 256$ one-bit stages. At the end of an even frame, each register $2150_h$ has stored an octet corresponding to the component channel $IT_{i,h}$ and all the bits of the octets having the same rank r, lying between 0 and 7, are arranged along a single column. At this instant, a signal transmitted on a wire 5100 from the time base circuit 510 simultaneously controls, via thirty-two bit state inversion deciding circuit $2800$ to $2803_1$, the transfer of the eight parallel bits of the octets from registers $2150_0$ to $2150_{31}$ into the last eight stages of shift registers $2160_0$ to $2160_{31}$, which make up the second buffer store $216_i$. The first stage (to the right side in FIG. 1) of each shift register $2160_h$ contains an additional bit which is provided from the respective bit inversion deciding circuit $280_h$. The state of each additional bit in the first stage indicates whether or not the transferred bits have been state inverted, as seen hereinafter. Simultaneously, the shift registers in the buffer store $217_i$ assigned to the odd PCM frames are connected in series so as to store the subsequent component octets during the subsequent odd PCM frame, in a manner similar to the preceding storing operation.

During the storing of the aforementioned next odd frame, the 9-bit words in the shift registers $2180_0$ to $2160_{31}$ are processed bit by bit. First the additional bits and then the same rank bit of the octets in the component channels $IT_{0,0}$ to $IT_{0,31}$ are read by nine translations of the columns in the store $216_i$ towards the right. The $2^N$ groups of 32 bits of equal rank r are transferred in parallel, starting from the $2^N$ stores $216_0$ to $216_{2^N-1}$ to the corresponding storage cells $220_{i,h}$ of the store 220 via OR gates 209 at a frequency of $9 \times 8 = 72$ kHz transmitted from the time base circuit 510 on a wire 5101. This frequency of 72 kHz corresponds to the frequency of the recurrent frames $F_a$, $F_0$ to $F_7$ in the intermediate multiplex highway 40. Indeed, the multiframe PCM frequency equal to 8 kHz must be maintained in the intermediate multiplex highway 40.

Figure 3:
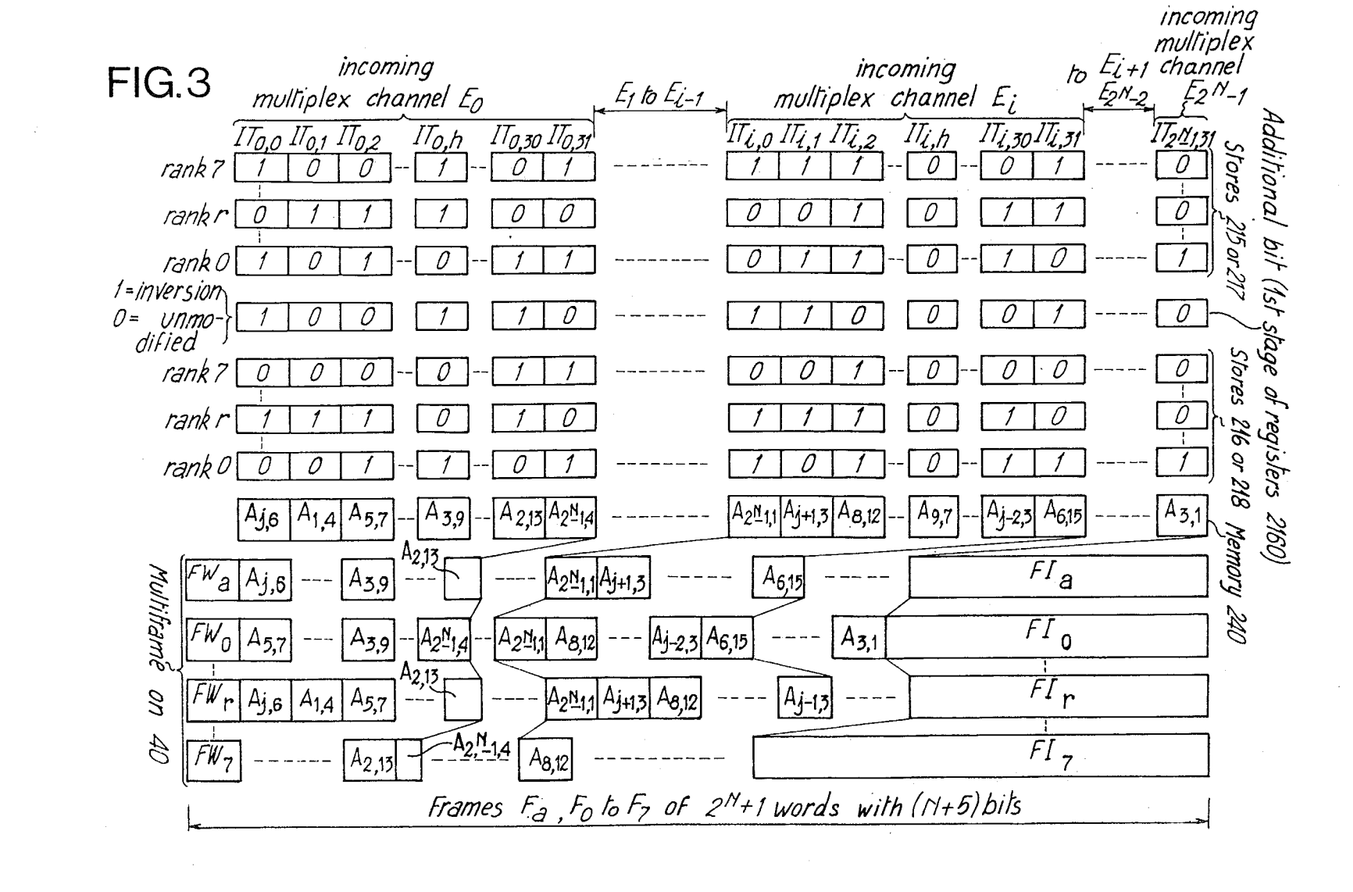
FIG. 3 is an illustration of the address word intermediate multiplex highway multiframe format according to the first embodiment.

By way of example, in the first three lines in FIG. 3 are illustrated the last rank-7 bits, rank-r bits and rank-0 bits of the component channels $IT_0$, $IT_1$, $IT_2 \ldots IT_h$, $\ldots IT_{30}$, $IT_{31}$ of each of the incoming multiplex channels $E_0$ and $E_i$. These bits are stored prior to the preceding transfer in the rank-7, rank-r, rank-0 stages of the respective shift registers $2150_0$ to $2150_{31}$ of the stores $2150$ and $215_i$. It is assumed that the rank-0 bits of the aforementioned component channels $E_0$ to $E_i$ are equal to 1, 0, 1 ..., 0, ... 1, 1 and 0, 1, 1, ... 0, ... 1, 0, that the rank-r bits are equal to 0, 1, 1, ... 1, ... 0, 0 and 0, 0, 1, ... 0, ... 1, 1 and that the rank-7 bits are equal to 1, 0, 0, ... 1, ... 0, 1 and 1, 1, ... 0, ... 0, 1 respectively. Moreover, it is assumed that at this transfer instant the connections between the aforementioned incoming component channels $IT_{i,h}$ and the outgoing component channels $IT_{j,k}$ are the following: $IT_{0,0}$–$IT_{j,6}$, $IT_{0,1}$–$IT_{1,4}$, $IT_{0,2}$–$IT_{5,7}$, $\ldots IT_{0,h}$–$IT_{3,9}$, $\ldots IT_{0,30}$–$IT_{2,13}$, $IT_{0,31}$–$IT_{2N-1,4}$ for the incoming multiplex channel $E_0$ and $IT_{i,0}$–$IT_{2N-1,1}$, $IT_{i,1}$–$IT_{j+3,3}$, $IT_{i,2}$–$IT_{8,12}$ $\ldots IT_{i,h}$–$IT_{9,7}$, $\ldots IT_{i,30}$–$IT_{j-2,3}$, $IT_{i,31}$–$IT_{6,15}$ for the incoming multiplex channel $E_i$.

The addresses $A_{j,k}$ of the corresponding outgoing component channels $IT_{j,k}$ are indicated in the eighth line of FIG. 3. These addresses are previously stored in the storage cells $240_{0,0}$ to $240_{0,31}$ and $240_{i,0}$ to $240_{i,31}$ of the address memory 240 which corresponds to the aforementioned incoming channel under the control of the switching unit 520, and are selectively read-out and multiplexed at a frequency of 2,048 kHz as soon as the corresponding read-out authorization circuits $230_{0,0}$ to $230_{2N-1,31}$ and $230_{i,0}$ to $230_{i,31}$ have recognized bits in the state "1," as per U.S. Pat. No. 4,258,434.

However, in accordance with the invention, state "1" bits which authorize the read-outs of the addresses contained in the memory 240 do not stem directly from the state "1" bits transmitted by the incoming PCM channels $E_0$ to $E_{2N-1}$. To enable the number of addresses transmitted in multiframe of the intermediate multiplex highway 40 and corresponding to the octet bits to be strictly less than half the bits received, the bits in each octet transferred from a register 2150 to a register 2160 must be inverted if the octet includes a number of state "1" bits which is greater than four, such that in this case the addresses actually transmitted correspond to the received bits in state "0," numbering less than four. The fourth line in FIG. 3 indicates the state of the additional bit which is transmitted by the respective bit inversion deciding circuit 280 in the first stage of the respective register 2160. If P represents the weight of an octet which results from adding the eight bits of the octet in the respective deciding circuit 280, the additional bit is in state "1" if $P>4$; this implies an inversion of the bits of the octet, such that the additional bit is in state "0" if $P\leq 4$ which implies that the octet bits are transferred without being modified, as in the aforesaid U.S. patent. In other words, the inversion of bit states in an octet occurs if the octet contains at least five bits in state "1."

In the fourth line of FIG. 3, the additional bits of the aforesaid incoming component channels are assumed to equal to 1, 0, 0, ... 1, 0 ... and 1, 1, 0, ... 0, ... 0, 1. This means that at the instant in question, the octets of the incoming component channels, such as $IT_{0,0}$, $IT_{0,h}$, $IT_{0,30}$, $IT_{i,0}$, $IT_{i,1}$ and $IT_{i,31}$ contain at least five bits in state "1" and that the octets of incoming component channel such as $IT_{0,1}$, $IT_{0,2}$, $IT_{0,31}$, $IT_{i,2}$ $IT_{i,h}$ and $IT_{i,30}$ contain at most four bits in state "1." The fifth, sixth and seventh lines in FIG. 3 respectively indicate the states of rank-7, rank-r and rank-0 bits in the last eight stages of the registers 2160, after transfer via the respective deciding circuits 280.

After this, the previously described operations have been performed, a bit-by-bit switching processing carries on in the read-out authorization circuits 220 and the address memory 240 in an analogous way to that described in the aforesaid U.S. patent except that, instead of processing eight data bits for each component channel, the receiving and switching part process nine bits, i.e. eight data bits plus the additional bit. The multiframe of the multiplex highway 40 then contains nine frames, the first of which corresponds to the additional bits in order to perform or not to perform the data bit inversion in the outgoing multiplex channel transmission parts. This first frame is signalled by a framing word $FW_a$ which is read out from the framing word read-only memory 250. In this manner, as shown on the ninth line in FIG. 3, each address $A_{j,6}$, ... $A_{3,9}$, ... $A_{2,13}$ and $A_{2N-1}$, $A_{j+1,3}$, ... $A_{6,15}$ corresponding to a connection relative to the incoming multiplex channel $E_0$ and $E_i$ in which the octets have undergone inversion, is read in memory 240. As in the other frames, the transmissions of these addresses are adjacent and follow after the transmission of the framing word $FW_a$. A free time interval $FI_a$ is also available at the end of the first frame for any possible transmission of supervisory words or analogous words from the read-and-write memory 260 under the control of the switching control unit 520.

Once the addresses corresponding to the additional bits and included in the first frame have been read out, the selectively inverted data bits depending on the case, are read out at the frequency of 72 kHz, by shifting the octets in the registers 2160. Each read-out operation relative to the same-rank bit is preceded by appropriate framing word $FW_0$ to $FW_7$ which characterizes the respective bit having the rank 0 to 7, and is followed by a free time interval $FI_1$ to $FI_7$. Usually, the free time intervals have different durations. The following eight frames are thus formed, as shown on the last three lines in FIG. 3, for the frames corresponding to the data bits having the ranks 0, r and 7. Each framing word is read from the read-only memory 250 under the control of the time base 510 and each set of supervisory words, if required, is selectively read from the read-and-write memory 260 under the control of the control switching unit 520. The framing, address and, if required, supervisory words are transmitted, as in U.S. Pat. No. 4,258,434, either in parallel on an 8-wire link making up the intermediate multiplex highway 40 or in series via a parallel-to-series converter 270, as illustrated in FIG. 1. When the even multiframe has thus been constituted, after processing the nine-bit words contained in all of the buffer stores $216_0$ to $216_{2N-1}$, the time-base 510 orders the following nine-bit words contained in the other buffer stores $218_0$ to $218_{2N-1}$ to be processed to form the following odd multiframe.

Because the number of state "1" bits in the last eight stages of the registers 2160 is less than or equal to $(32 \times 8 \times 2^N)/2$, and as a corollary, the number of addresses transmitted in the last eight frames $F_0$ to $F_7$ is less than or equal to the previous number, the total duration of the free time intervals $FI_0$ to $FI_7$ occupies a time interval available for transmitting supervisory words equal to or greater than $32 \times 8 \times 2^{N-1}$ address words. According to the aforesaid U.S. patent, this total duration of the free time intervals FI can be reduced to zero, should the bits of all octets be in state "1," which does not allow the insertion of supervisory words. On the other hand, according to the present invention, binary rate in the intermediate multiplex highway 40 is substantially increased due to the fact that the multiframe contains an additional frame $F_a$. This rate is equal to $2,048 \times (2^N + 1/32) (N+5) \times (9/8)$ kbits/s, by assuming, as in the aforesaid U.S. patent, that each framing word $FW_a$, $FW_0$ to $FW_7$ and each address word comprises $(N+5)$ bits and that each address word comprises a first part which has N bits and identifies the respective outgoing multiplex channel $S_j$ and a second part which has 5 bits and identifies the respective component channel $IT_{j,0}$ to $IT_{j,31}$ of this outgoing multiplex channel $S_j$.

Figure 4:
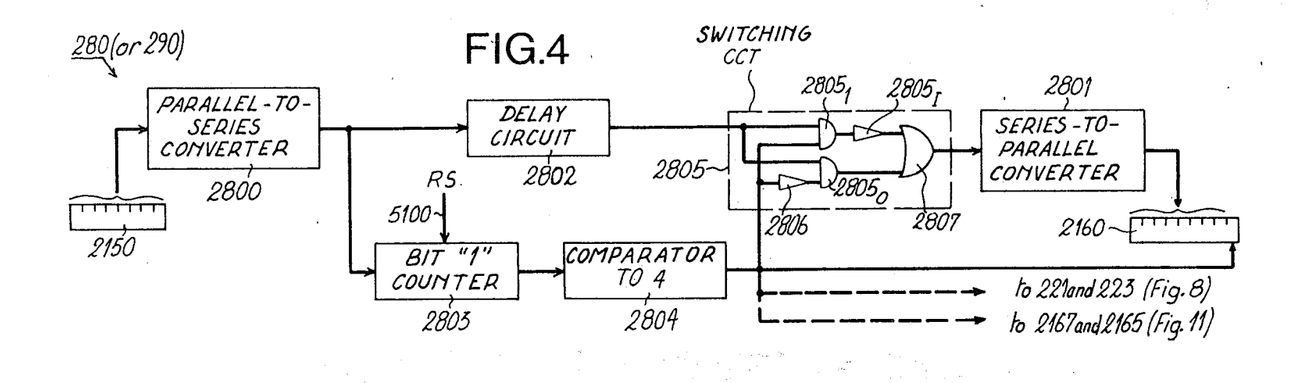
FIGS. 4 and 5 are block-diagrams of a bit inversion deciding circuit of an incoming component channel included in the receiving and switching part of FIG. 1.

FIG. 4 is a block diagram of a first embodiment of a bit inversion deciding circuit 280 (or 290) which is part of an incoming component channel. At the input and output of the circuit of FIG. 4 are respectively parallel-to-series converter 2800, which receives the eight parallel bits from the corresponding register 2150, and series-to-parallel converter 2801 which delivers the eight preceding selectively inverted bits to the last eight stages of the corresponding register 2160. The output of the parallel-to-series converter 2800 is connected in parallel to the input of a delay circuit 2802 and to the input of a counter 2803 which counts the state "1" bits of the octets stored in the register 2150. After the contents of each register 2150 have been read-out, the counters 2803 are reset to zero (RS) by the time-base circuit 510, via the bus 5100. This zero-resetting operation triggers coupling the count from the counter 2803 to comparator-to-4 circuit 2804, which feeds the additional bit its output. If P designates the count in the counter 2803, the additional bit is one "1" if $P>4$ to control the inversion of the eight data bits via a switching circuit 2805 which is interconnected between the delay circuit 2802 and the series-to-parallel converter 2801.

The delay circuit 2802 imposes a delay equal to the duration of the inversion decision performed by the circuits 2803 and 2804. The switching circuit 2805 comprises two AND gates $2805_0$ and $2805_1$ having digital inputs connected to the output of the delay circuit 2802 and control inputs connected directly and via an inverter 2806 to the output of the comparator 2804. When $P>4$, AND gate $2805_1$ is open to transmit the serialized octet to an inverter $2805_i$ and then to one input of an OR gate 2807. When $P\leq 4$, the AND gate $2805_0$ is open to feed the serialized octet directly to the other input of the OR gate 2807. OR gate 2807 derives data octets having bit states selectively inverted, depending on the number P of state "1" bits they contain; the data octets derived by gate 2807 are supplied to the input of the series-to-parallel converter 2801. The additional bit is delivered from the output of the comparator 2804 to the first stage of the corresponding register 2160.

Figure 5:
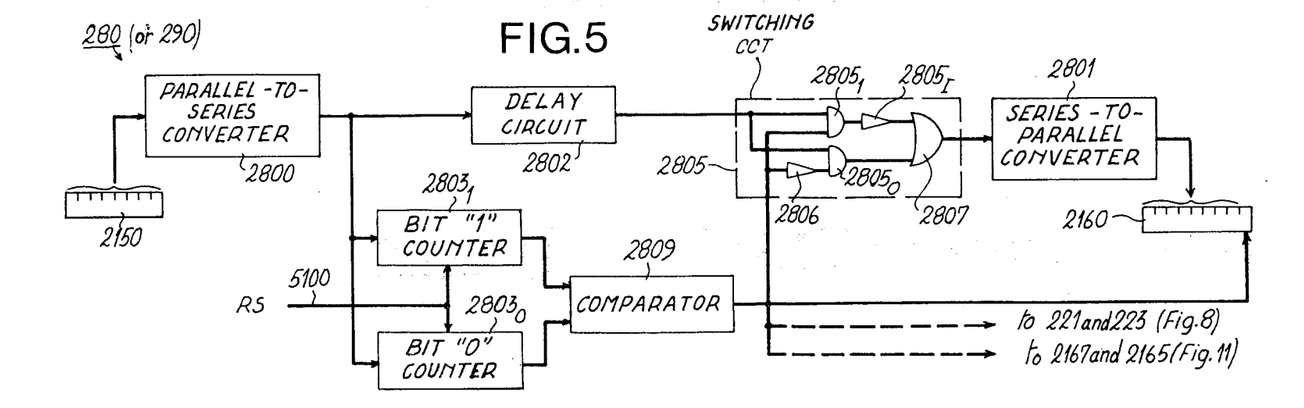

A further embodiment of a bit inversion deciding circuit 280 (or 290), shown in FIG. 5, comprises, as before, the parallel-to-series converter 2800, the delay circuit 2802, the switching circuit 2805 and the series-to-parallel converter 2801. The other channel assigned to the deciding means is made up of two counters $2803_0$ and $2803_1$ that transmit signals representing counts $P_0$ to $P_1$ therein to the inputs of a comparator 2809. The counter $2803_0$ counts the state "0" bits and the counter $2803_1$ counts the state "1" bits. The comparator 2809 compares the counts $P_0$ and $P_1$ and transmits the additional bit to the control input of the AND gate $2805_1$, the inverter 2806 and the first stage of the corresponding register 2160. The additional bit is in state "0" if $P_0 > P_1$, i.e. if the number of state "0" bits in the octet is greater than the number of state "1" bits, which implies direct octet transmission. If $P_0 \leq P_1$, the additional bit is in state "1" and there is an inversion of the octet bits.

The second embodiment (FIG. 5) is preferably employed since the decision threshold is independent of the number of bits contained in a data word, in this case an octet.

With reference now to FIG. 2, certain features regarding the organization and operation of a transmission circuit of the transmission part, such as part $60_j$ assigned to the outgoing multiplex channel $S_j$, are recapitulated as seen in U.S. Pat. No. 4,258,434, in conjunction with those features peculiar to the invention.

On the input side, the intermediate multiplex highway 40 is connected to the inputs of a time-base circuit 610 and a series-to-parallel converter 620 when the highway 40 is a one-wire multiplex. The time base circuit 610 contains a clock extraction circuit 6110 which extracts the clock signal from the bit transmission on the intermediate highway 40. The circuit 6110 is connected to an outgoing PCM reframing circuit 6120 which restores the clock signals at outgoing bit and octet frequencies of 2,048 kHz and 256 kHz. At the output of the converter 620, address words $A_{j,k}$ and framing words $FW_a$, $FW_0$ to $FW_7$, in particular, are transmitted as parallel N+5-bit words along an N+5 wire bus to three detectors 630, 640 and 641. Each of these detectors comprises a comparing circuit which compares each transmitted (N+5) bit word with one or several words previously memorized, i.e., stored, in the respective detector.

The detector 630 compares the received words with the framing words $FW_a$, $FW_0$ to $FW_7$ corresponding respectively to the starts of the address frames transmitted in response to state "1" additional bits and in response to the selectively inverted data bits in state "1," such as stored in the registers 2160 (FIG. 1). The detector 630 transmits a clock signal at the received 72 kHz frame frequency to a frame counter 6130. After division by 8/9 and 1/9 respectively, the detector 630 delivers one clock signal at the outgoing 64 kHz component channel frequency to the reframing circuit 6120, and delivers one clock signal at the outgoing 8 kHz PCM frame (or incoming multiframes coming from the intermediate multiplex highway 40) frequency, to the reframing circuit 6120 and to a PCM even frame write-in and odd frame read-out circuit 681 and PCM odd frame write-in and even frame read-out circuits 682. The 8 kHz clock signal makes it possible to distinguish between the even and odd multiframes with a view to writing and reading them in opposition. The detector 630 also supplies, along an output wire 635, a fourth 8 kHz clock signal having a pluse with a width of $10^3/72 = 13.9$ μs, in response to detection of the additional framing words $FW_a$.

The detectors 640 and 641 recognize whether an address word $A_{j,k}$ corresponding to the transmission of a state "1" bit is intended for a component channel in the corresponding outgoing multiplex channel $S_j$. The detector 640 compares the first N-bit part of each transmitted address word $A_{j,k}$ with the N-bit address word $A_j$. The detector 641 compares the second 5-bit part of each transmitted address word $A_{j,k}$ with the thirty-two 5-bit address words of the component channels $IT_{j,0}$ to $IT_{j,31}$ of the outgoing channel $S_j$. If the address $A_j$ is detected by the detector 640, a write control circuit 651 for the state "1" bits writes the same rank r bits into 32 cells of a store 660 which correspond to the addresses of the component channel $IT_{j,k}$ detected by the detector 641. This write-in operation in the same rank bit store 660 is performed in parallel over a time less than the duration of a frame of the intermediate multiplex highway 40 which frame duration is equal $125/9 = 13.9$ μs. The other cells of the store 660 which have been periodically reset to zero (RS) periodically at the beginning of each of the nine frames by a zero-resetting circuit 652 connected to the frame counter 6130, stays at state "0". For one and the same rank, the bits in state "0" contained in the store 660 correspond to those in state "0" of the same rank which have been stored in the registers 2160 that are assigned to the component channels $IT_{i,h}$ of the incoming multiplex channels $E_0$ to $E_{2N-1}$ in conjunction with the component channels $IT_{j,k}$ of the outgoing channel $S_j$, i.e. the incoming component channels which have not brought about a transmission of addresses along the intermediate multiplex highway 40.

Figure 6:
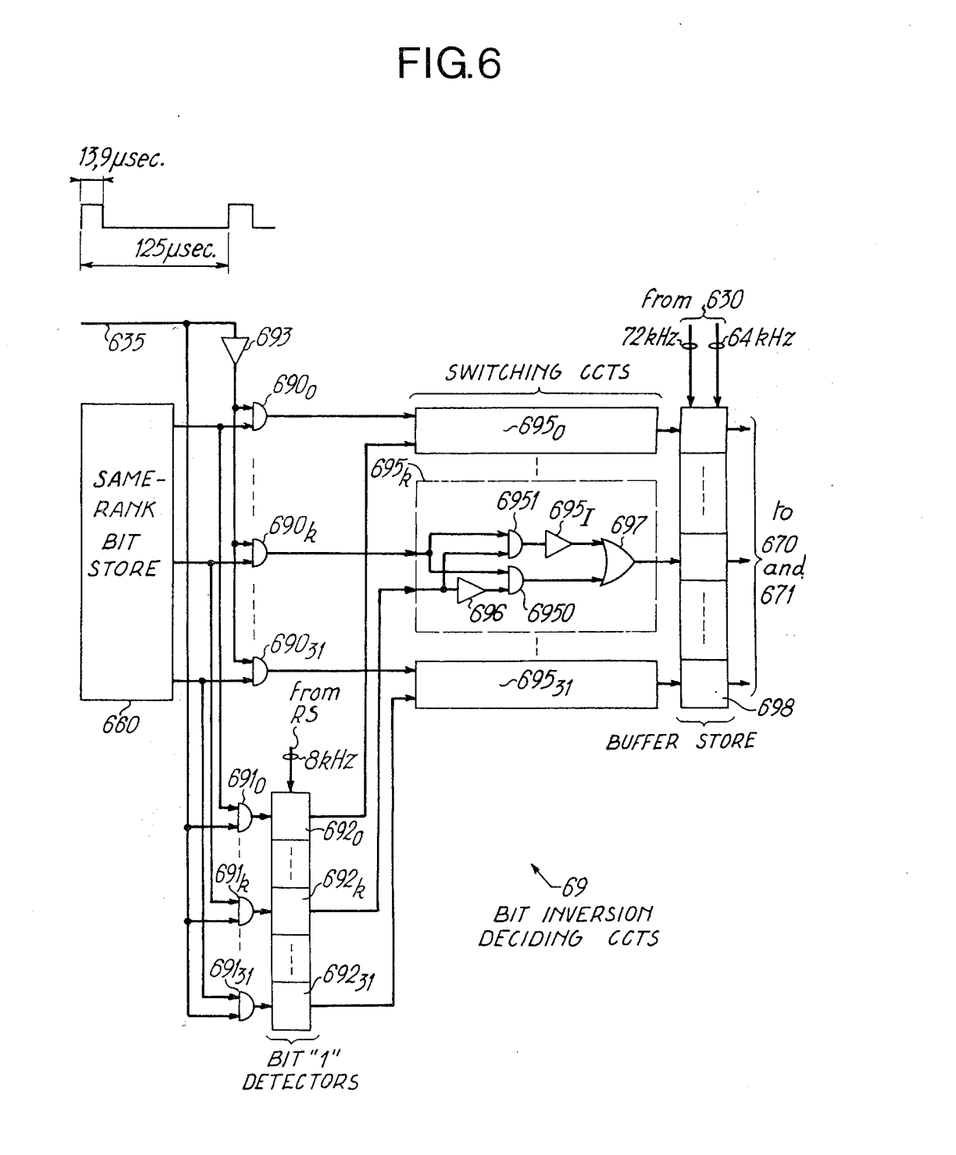
FIG. 6 is a block-diagram of the bit inversion deciding circuit included in the detailed multiplex outgoing channel transmission circuit of FIG. 2.

The bits of same rank r are next transmitted in parallel along the 32 outputs of the store 660 to a bit inversion deciding circuit 69, peculiar to this invention. A preferred embodiment of the circuit 69 is illustrated in FIG. 6.

The bit inversion deciding circuit 69 comprises two sets of thirty-two AND gates $690_0$ to $690_{31}$ and $691_0$ to $691_{31}$ having digital inputs respectively connected to outputs of the same rank bit store 660. AND gates $691_0$ to $691_{31}$ are controlled directly by the aforesaid fourth clock signal which is delivered by the output wire 635 of the detector 630, such that the gates $691_0$ to $691_{31}$ only provide the additional bits to additional bit detectors $692_0$ to $692_{31}$. On the other hand, the AND gates $690_0$ to $690_{31}$ are controlled via an inverter 693 by the aforesaid fourth clock signal of the detector 630, such that the gates $690_0$ to $690_{31}$ are transparent only to the eight data octet bits. The deciding circuit 69 also comprises thirty-two switching circuits $695_0$ to $695_{31}$ and a buffer store 698 having thirty-two storage cells. Each of the switching circuits 695 is identical to the bit inversion deciding circuit 2805 described with reference to FIG. 4. Each of circuits 695 comprises two AND gates 6950 and 6951, two inverters $695_j$ and 696 and an OR gate 697; the components are respectively identical to the elements $2805_0$, $2805_1$, $2805_j$, 2806 and 2807 of the circuit 2805 respectively. The output from each additional bit detector $692_0$ to $692_{31}$, preferably a bistable flip-flop, is connected in the associated switching circuit $695_0$ to $695_{31}$ directly and, via the inverter 696, to the control inputs of the AND gates 6951 and 6950 having digital inputs connected to the output of the AND gate $690_0$ to $690_{31}$ associated therewith.

Under the control of the detectors 692, the switching circuits 695 perform the inverse operations to those which are performed by the switching circuits 2805, in order to restore the bits actually transmitted by the incoming component channels $IT_{i,h}$. This amounts to transforming one of the fifth and sixth lines in FIG. 3 for a same rank r (r varying from 0 to 7) into one of the first and third lines in the same FIG. 3.

The buffer store 698 has thirty-two storage cells which are connected to the outputs of the OR gates 697 of the switching circuits $695_0$ to $695_{31}$. The store 698 modifies the binary rate, i.e. the rate of the transmitted address words, to derive the binary rate of the outgoing multiplex channel $S_j$. Store 698 is controlled by the clock signals from the detector 630, so data are respectively written into and read out of the store at 72 kHz and 64 kHz.

Reconstitution the even and odd frames in the outgoing PCM multiplex channel $S_j$ is thus analogous to that described in the aforementioned U.S. patent. With this in mind, two stores 670 and 671 are assigned to the even multiframes and the odd multiframes in the intermediate multiplex highway 40, or to the even frames and the odd frames of the outgoing PCM channel $S_j$. The stores 670 and 671 combine the same-rank bits into parallel octets in the opposite manner to the combinations brought about by the stores such as stores $215_i$-$216_i$ and $217_i$-$218_i$ in FIG. 1.

Eight successive groups of 32 parallel bits read one after the other in the buffer store 698 are written in the even frame store 670, whilst the 32 octets which correspond to the 8 successive groups of 32 previously transmitted parallel bits are read in the odd frame store 671 and vice-versa. Based on the 8 kHz frame frequency from the frame detector 630, circuit 681 transmits the write-in orders of the even frames and the read-out orders of odd frames to stores 670 and 671, respectively, while the circuit 682 transmits the write-in orders of the odd frames and the read-out orders of the even frames to the stores 670 and 671. The groups of 32 parallel bits are written at 256 kHz into the 32 shift registers of the store 670 and 671, such that each shift register stores the complete octet of a channel $IT_{j,k}$ after a multiframe period of 125 μs. Next, during the subsequent multiframe period, the parallel, stored octets $IT_{j,0}$ to $IT_{j,31}$ are read in the same order in series by setting the 32 shift registers of the store 670 or 671 in series, and are transmitted onto the outgoing channel $S_j$.

Figure 7:
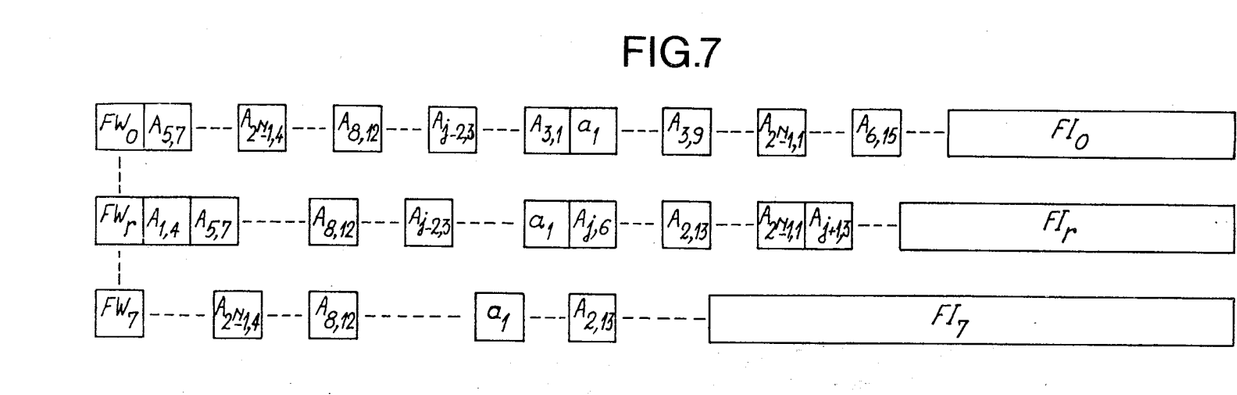
FIG. 7 is an illustration of the address word intermediate multiplex highway multiframe format according to a second embodiment.

In FIG. 7 there is illustrated a second configuration of the address multiframe format which can be conveyed by the intermediate multiplex highway 40. In each of eight frames $F_0$ to $F_7$ of this multiframe, the address words which are associated with the unmodified octets are set out immediately after the framing word FW. Then, in each frame, the last of these address words is followed by a so-called bit inversion word $a_1$, after which the address words which are associated with the octets including inverted bits, are set out.

In FIG. 7 are illustrated the address frames corresponding to the data bits which have ranks 0, r and 7 and which belong to initial octets having the characteristical states indicated in the first four lines of FIG. 3, as well as address frames corresponding to the incoming and outgoing component channel connections $IT_{i,h}$–$IT_{j,k}$ mentioned in FIG. 3.

In comparison to the multiframe illustrated in FIG. 3, the multiframe illustrated in FIG. 7 does not contain a specific frame $F_a$ which implicitly indicates the octet bit state inversions. This implicit indication is detected in transmission circuits $60_j$ by a lay-up of the addresses which corresponds to non-inverted octets, immediately after the framing words $FW_0$ to $FW_7$ and by a lay-up of the addresses which corresponds to the inverted octets, immediately after the words $a_1$. Consequently, the binary rate along the intermediate multiplex highway is reduced with respect to that in the first configuration, and is substantially increased with respect to that in the aforesaid U.S. patent, although the number of address words transmitted in the frames $F_0$ to $F_7$ of the highway 40 is always less than $2^{N-1} \times 32 \times 8$. The binary rate is thus equal to $2,048 \times (2^N + 1/16) (N+5)$ kbits/s assuming that each word contains (N+5) bits.

As an example, for the frame associated with the rank r, in relation to the component incoming channels $IT_{0,0}$, $IT_{0,1}$, $IT_{0,2}$, ... $IT_{0,4}$, ... $IT_{0,30}$ and $IT_{0,31}$ of the incoming PCM multiplex channel $E_0$, the addresses $A_{1,4}$, $A_{5,7}$, ... are transmitted after the framing word $FW_r$ since the bits having the rank r (FIG. 3, sixth line) and the inversion indication bits (FIG. 3, fourth line) of the incoming component channels $IT_{0,1}$, $IT_{0,2}$ are equal to 1 and 0 respectively. The state of these first bits imposes the transmission of an address on the outgoing component channel and the state of these second bits "0" indicates that there was no octet bit inversion. Conversely, the rank-r bits and the inversion indication bits of the incoming component channels $IT_{0,0}$ and $IT_{0,30}$ are all equal to 1. The state of the latter inversion indication bits means that the corresponding addresses $A_{j,6}$ and $A_{2,13}$ must be transmitted in the so-called inverted-bit zone, after the word $a_1$ of the frame $F_r$.

Figure 8:
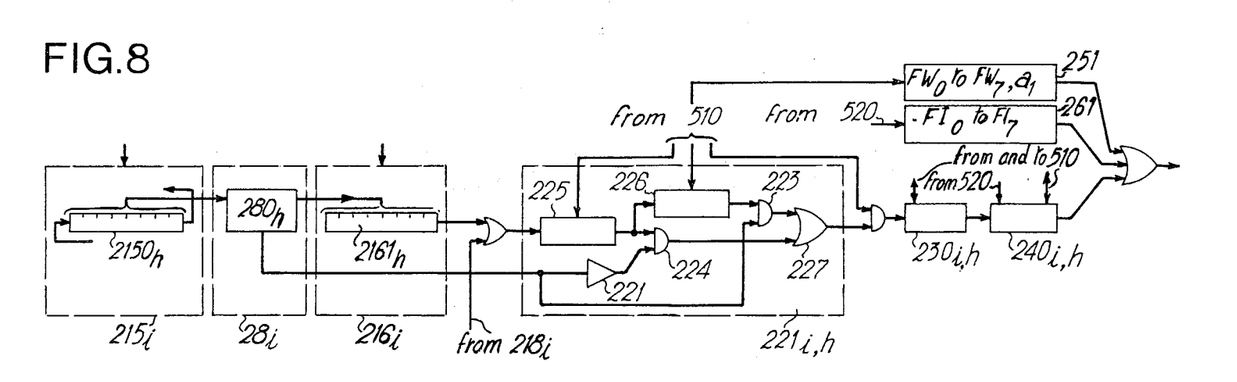
FIG. 8 is a circuit diagram of the receiving and switching part circuit chain according to the second embodiment in relation to an incoming component channel.

In FIG. 8 are schematically illustrated the modifications made to the receiving and switching part in FIG. 1 in relation to the units which are associated with an incoming component channel $IT_{i,h}$. The shift registers $2150_0$ to $2150_{31}$ of the buffer store $215_i$ (or $217_i$) and the bit inversion deciding circuits $280_0$ to $280_{31}$ of the circuit $28_i$ (or $29_i$) according to FIG. 4 or 5 are not modified. On the other hand, the shift registers $2161_0$ to $2161_{31}$ of the buffer store $216_i$ (or $218_i$) now comprise only eight stages as in the aforesaid U.S. patent, so as to receive in parallel the inverted or non-inverted octet bits which are delivered by the series-to-parallel converters 2801 of the deciding circuits 280. The additional bit provided by the comparator 2804 (or 2809) of each deciding circuit, such as circuit $280_h$ shown in FIG. 8, is delivered directly to the control input of an AND gate 223 and via an inverter 221 to the control input of an AND gate 224. Inverter 221 and AND gates 223 and 224 are included in a circuit $221_{i,h}$ having two one-bit stores 225 and 226 which replace the one-bit buffer store $220_{i,h}$ in FIG. 1. Circuit $221_{i,h}$ distinguishes between the non-inverted octet bits and the inverted octet bits. The first store 225 receives the outgoing 64 kHz bits from the register $2161_h$. In response to a read-out order from the timebase circuit 510, store 225 transmits to the received bits from register $2161_h$ to the other input of the AND gate 224 and to the second one-bit store 226. The output from the store 226 is connected to the other input of the AND gate 223 having an output that is combined with the output of AND gate 224 in OR gate 227, having an output supplied to an input of read-out authorization circuit $230_{i,h}$.

Thus, when the additional bit is in state "0," a data bit is transmitted from the store 225 to the memory cell $240_{i,h}$ via the open AND gate 224. Once store 225 has been read, the data bit is transferred irrespective of the additional bit in the store 226.

To obtain the frames in FIG. 7 for a period 15.6 μs, the time-base circuit 510 controls the read-out of all of stores 225 at the start of this period, so that the address memory 240 can (1) "explore" all the memory cells addressed by an inverted one, (2) bit transmit first addresses $A_{j,k}$ corresponding with framing word $FW_r$, which corresponds to the rank r of the bits, and (3) transmit a word $a_1$ along the intermediate multiplex highway 40. After an "end-of-exploration" signal has been received from the address memory 240, the time-base circuit 510 controls the read-out of the second stores 226, the contents of which are transmitted to the read-out authorization circuits 230 if the corresponding additional bits are in state "1" (AND gate 223 open). The previously read bits in state "1" authorize the read-out of addresses $A_{j,k}$ in the memory 240. The read addresses $A_{j,k}''$ are then inserted behind the aforesaid word $a_1$ in intermediate multiplex highway 40.

In contrast to the memories 250 and 260 in FIG. 1, the intermediate highway multiframe configuration of FIG. 7, includes a read-only memory 251 and a read-and-write memory 261 in the receiving and switching part of FIG. 8 which respectively contain framing words $FW_0$ to $FW_7$ and an inversion indication word $a_1$, and supervisory words to be transmitted in variable free intervals $FI_0$ to $FI_7$.

Figure 9:
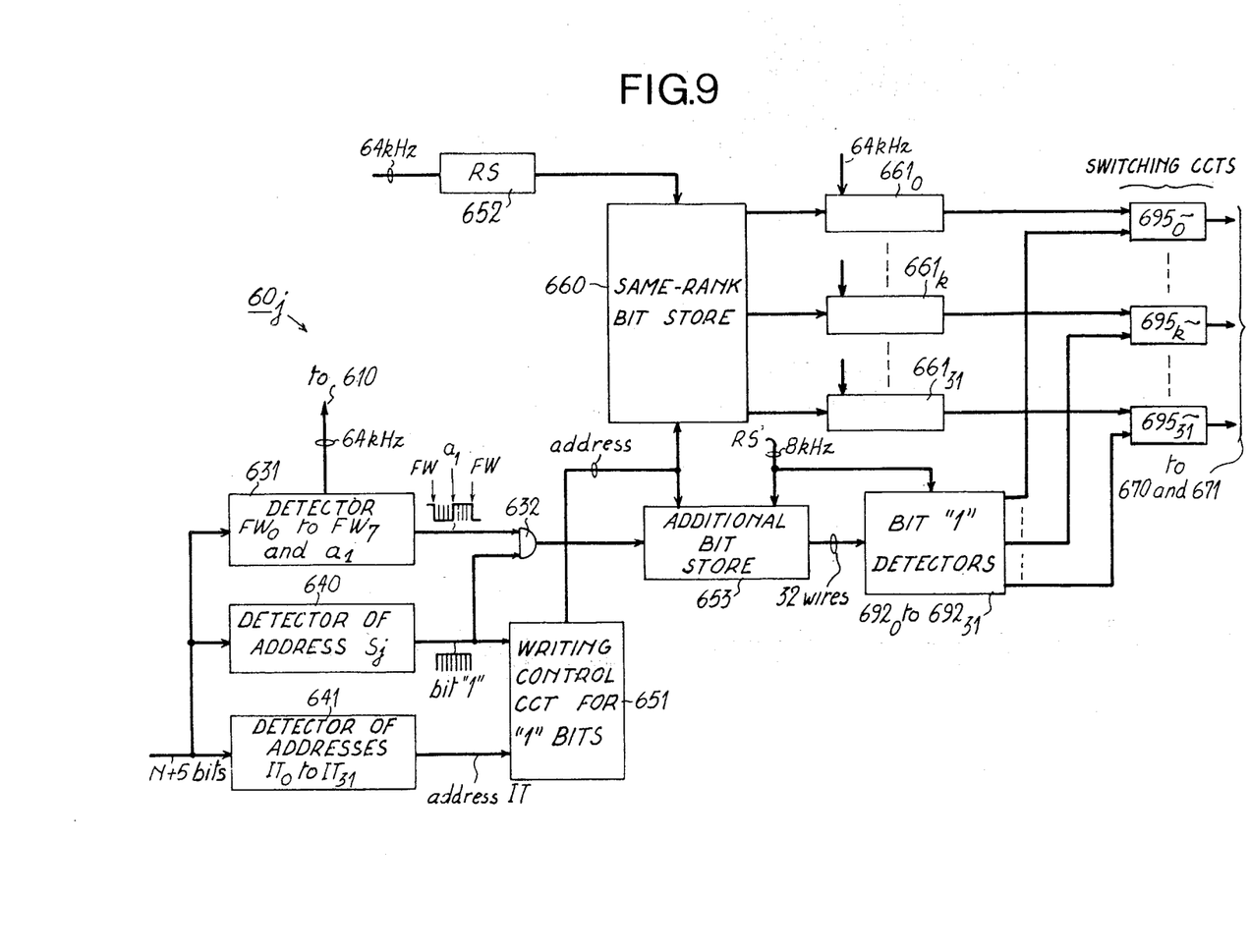
FIG. 9 is a block diagram of the modifications to the detailed multiplex outgoing channel transmission circuit in FIG. 2 according to the second embodiment.

In FIG. 9 is partially illustrated the transmission part $60_j$ for transmitting the multiframe format of FIG. 7. The circuits 610, 620, 681, 682, 670 and 671 are not depicted and are analogous to those shown in FIG. 2 of U.S. Pat. No. 4,258,434. Likewise, the circuits 640, 641, 651, 660, $692_0$ to $692_{31}$ and $695_0$ to $695_{31}$ are analogous to those shown in FIGS. 2 and 6. The chief modifications concern:

a detector 631 in lieu of the detector 630 (FIG. 2), which detector 631 compares the transmitted words with the eight framing words $FW_0$ to $FW_7$ and with the word $a_1$ and transmits the 64 kHz frame frequency;

inserting an additional bit memory 653 having thirty-two cells having parallel outputs connected to the inputs of the additional bit detectors $692_0$ to $692_{31}$; and parallel interconnections of shift registers $661_0$ to $661_{31}$ between the outputs of same-rank bit store 660 and the common digital inputs to the AND gates 6950 and 6951 of the switching circuits $695_0$ to $695_{31}$ detailed in FIG. 6.

The detector 631 produces a signal which controls an AND gate 632 and which has a frequency of 64 kHz. The pulses in this control signal have a binary, i.e., logic, level "0" in the interval between detection of a framing word FW and the following word $a_1$; the pulse have a one logic level after the detection of the word $a_1$. The other input of the AND gate 632 is connected to the output of detector 640 which detects the address of the outgoing multiplex channel $S_j$ (first part of addresses $A_{j,k}$). Additional bit store 653 responds to the output of gate 632 which is a pulse sequence at level "0" in response to address words which are detected immediately after a framing word $FW_0$ to $FW_7$, and a pulse sequence at level "1" in response to address words which are detected immediately after word $a_1$. The first and second pulses respectively correspond to additional bits which indicate the transfer of an initial octet without inversion and with inversion. At the end of a multiframe, the store 653 contains additional bits, such as transmitted by comparators in the bit inversion deciding circuit 280 of FIG. 8. Indeed, each time a "1" bit is written in the same rank bit store 660, a corresponding additional bit is written in the additional bit store 653 at the same address as derived by the writing control circuit 651.

According to the multiframe format illustrated in FIG. 7, octets in which all bits are in state "0" or "1" cannot be detected since they cannot be distinguished in the transmission circuits with no address being transmitted either after an FW word or after an $a_1$ word. In this case, when an octet 11111111 is transmitted by an incoming PCM component channel E, a specific circuit (not shown) included in each bit inversion deciding circuit 280 controls the introduction of the corresponding outgoing component channel $IT_{j,k}$ address, e.g. in the first of the eight intermediate highway frames lying between FW and $a_1$. This amounts to neutralizing the bit inversion procedure for this particular case. On the other hand, an incoming zero word from a PCM channel E does not give rise to any address $A_{j,k}$ transmission.

SInce a multiframe must be wholly received to enable detection of the inversion bits in the store 653, the same rank bits are delayed in the eight-bit shift registers $661_0$ to $661_{31}$. At the end of each multiframe, the content of the additional bit store 653 are transferred to the bit "1" detectors $692_0$ to $692_{31}$ so as to go through with any inversion in the switching circuits $695_0$ to $695_{31}$ in relation to the octets in the registers $661_0$ to $661_{31}$, as for the procedure described in reference to FIG. 6. The same rank bits are then transmitted in parallel to even and odd multiframe memories 670, 671, as in U.S. Pat. No. 4,258,434.

Figure 10:
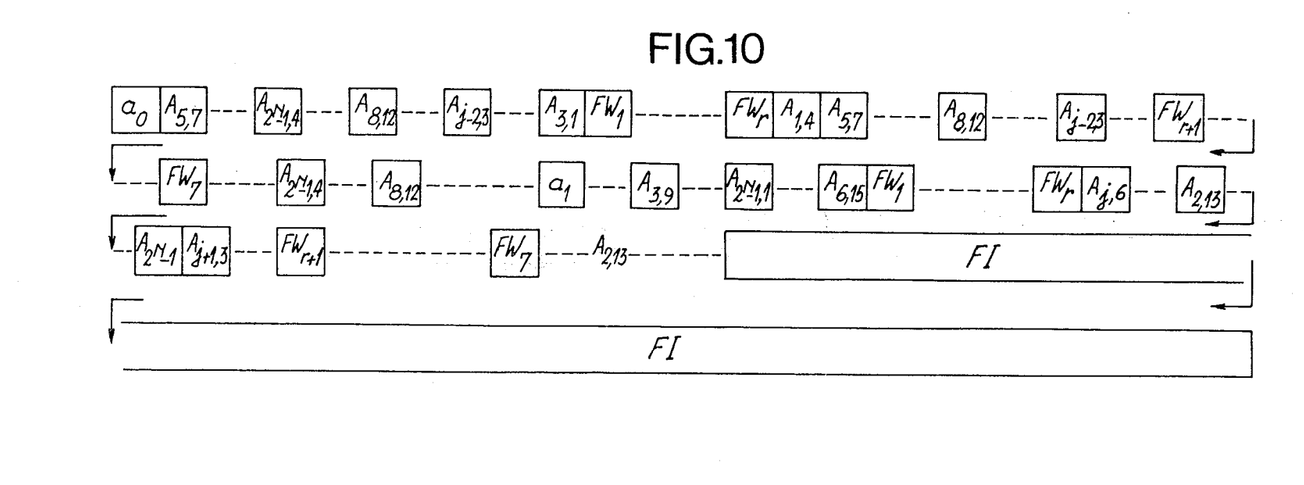
FIG. 10 is an illustration of the address word intermediate multiplex highway multiframe format according to a third embodiment.

In FIG. 10 is illustrated a third address multiframe format which can be conveyed by the intermediate multiplex highway 40. Its structure is similar to that of FIG. 7 except that (1) the address words corresponding to all the non-inverted initial octets are grouped at the start of the multiframe after a word $a_0$ which indicates the non-inversion, and (2), following this first address group, a word $a_1$ indicates the inversion and is followed by address words which corresponds to all the inverted initial octets. By assuming that the initial octets of the incoming component channels $IT_{0,0}$, $IT_{0,1}$, $IT_{0,2}$, . . . $IT_{0,h}$, . . . $IT_{0,30}$, $IT_{0,31}$ are indicated on the first four lines in FIG. 3 in correspondence with the addresses of the outgoing component channels on the right line in FIG. 3, the multiframe in accordance with this third configuration comprises:

word $a_0$, followed by a group of address words $A_{5,7}$, . . . $A_{2N-1,4}$, . . . $A_{3,1}$ which corresponds to the rank-0 bits that have not undergone inversion, and seven other groups of address words such as $FW_r$, $A_{1,4}$, $A_{5,7}$, . . . $A_{8,12}$, . . . $A_{j-2,3}$, . . . which respectively correspond to the uninverted bits having the ranks 1 to 7, then following the word $a_1$, a group of address words . . . $A_{3,9}$, . . . $A_{2N-1,1}$, . . . $A_{2N-1,1}$, $A_{j+1,3}$ . . . which respectively correspond to the inverted bits having the ranks 1 to 7, and lastly a free interval FI which enables supplemental words peculiar to the supervision to be transmitted as already stated.

This "packing" of the address words at the start of the multiframe may also be envisioned for the multiframe in accordance with FIG. 7 in the aforesaid U.S. patent and with FIGS. 3 and 7 hereto, such that the free intervals, such as $FI_a$, $FI_0$ to $FI_7$, are grouped together in a single free interval FI at the end of the multiframe. In the present invention, because the number of transmitted addresses is always strictly less than a predetermined number equal to $(2^N \times 32) + (2^{N-1} \times 32) \times 8$ for the multiframe in FIG. 3, and to $(2^{N-1} \times 32) \times 8$ for the multiframes in FIGS. 7 and 10, the multiframe may contain a variable free interval FI which corresponds to (N+5) bit words transmitted along the multiplex highway 40, the bit words complement the number of transmitted addresses with respect to the above-indicated predetermined number. Put another way, the address-packing multiframe configuration makes it possible to reduce by one half the indicated bit-rate for a periodic-frame multiframe. In relation to FIGS. 3, 7 and 10, the binary rate for an address-packing multiframe having a duration of 125 μs is given in the table below:

| FIGS. | framing words (FW and a) | maximal number of address words | bit rate (kbits/s) |
|---|---|---|---|
| FIG. 3 | 8 + 1 | $2^N \times 32 \times 5$ | $2.048 \times \left(2^N + \frac{9}{160}\right) \times \frac{5}{8} \times (N + 5)$ |
| FIGS. 7 and 10 | 16 | $2^N \times 32 \times 4$ | $2.048 \times (2^N + \frac{1}{8}) \times \frac{1}{2} \times (N + 5)$ |

For the above indications, it has been assumed, as already pointed out, that both the address words, i.e., the address words having an N-bit first part and a 5-bit second part and framing words $FW_0$ to $FW_7$ and words $a_0$ and $a_7$ each comprises (N+5) bits.

The modifications to be made to the reception and switching part (FIG. 1) and the transmission part (FIG. 2) for a bit-by-bit switching network conveying multiframe according to FIG. 10 are described hereinafter.

Figure 11:
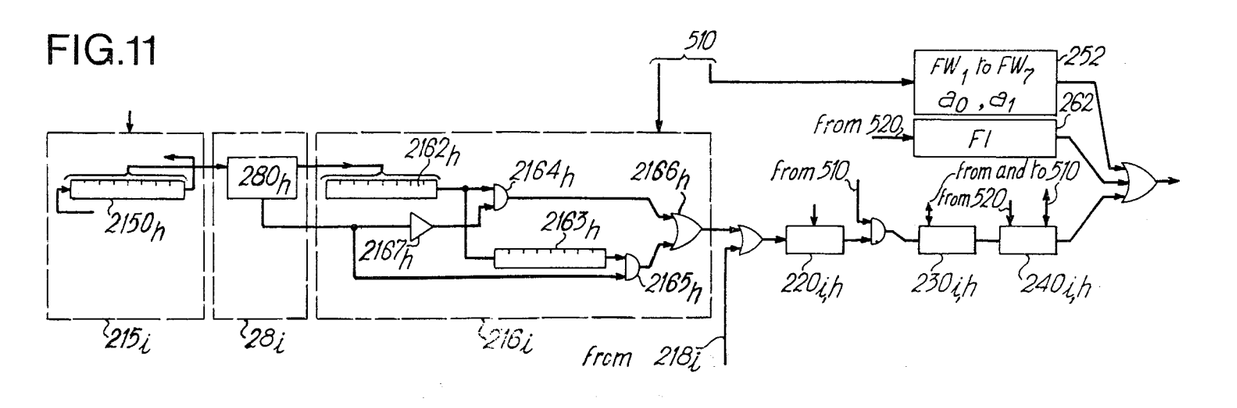
FIG. 11 is a circuit diagram of the receiving and switching part circuit chain according to the third embodiment in relation to an incoming component channel.

As in FIG. 8, FIG. 11 is a schematic diagram of the circuits included in the reception and switching part which is assigned to an incoming component channel $IT_{i,h}$. Apart from the structure of the store buffer $216_i$ (or $218_i$), all the other circuits $2150_h$, $280_h$, $220_{i,h}$, $230_{i,h}$ and $240_{i,h}$ are analogous to those in FIG. 1. Each register $2160_h$ in FIG. 1 is replaced by a circuit which has two eight stage shift registers $2162_h$ and $2163_h$. The first shift register $2162_h$ receives in parallel the octets which are transmitted by the series-to-parallel converter 2801 of the bit inversion deciding circuit $280_h$ (FIG. 4 or 5), and delivers the serialized bits of these octets to an AND gate $2164_h$ and to the input of the first stage of the second shift register $216_h$. The output of the shift register $2163_h$ is also connected to an input of an AND gate $2165_h$ having an output combined with that of the AND gate $2164_h$ are connected in OR gate $2166_h$ which supplies the serialized bits to the corresponding one-bit buffer store $220_{i,h}$. The output of deciding circuit $280_h$ (FIG. 4) is directly coupled to the other input of AND gate $2615_h$ and is coupled to the other input of AND gate $2166_h$ via inverter $2167_h$. The circuit including registers $2162_h$ and $2163_h$ is analogous to that having two one-bit stores 225 and 226 described in reference to FIG. 8. The operation of the circuit including registers $2162_h$ and $2163_h$ is also analogous, except that the shift registers $2162_h$ and $2163_h$ are not controlled in read-out for each frame but are controlled in read-out for each multiframe in the intermediate multiplex highway 40.

Thus, at the start of each multiframe according to FIG. 10, once the word $a_0$ has been read in a memory 252, which word $a_0$ serves as a rank 0 framing word, all the addresses corresponding to state "1" initial bits (not inverted) are read in the memory 240. To this end, after the octets have been written into the shift registers such as register $2162_h$, the time-base circuit 510 orders bit-by-bit read-out of these octets. The octets are transferred into the second shift registers, such as register $2163_h$, and are selectively fed through the AND gate $2164_h$ if the additional bit received at the input of the inverter $2167_h$ is a "0" to signal noninversion. This bit read-out is performed at a frequency greater than $2 \times 64$ kHz. After the first eight word groups, such as groups $a_0$, $A_{5,7}$, . . . $FW_1$, . . . $FW_r$, $A_{1,4}$, . . . $FW_7$, . . . $A_{2N-1,4}$, . . . $A_{8,12}$, . . . , as per FIG. 10, are transmitted along the intermediate multiplex highway 40 by reading out memory 252 (analogous to the memory 250 (FIG. 1) or memory 251 (FIG. 8)), and memory 240, the time-base circuit 510 triggers the read-out of the octets which are stored in the second shift registers $2163_h$, in response to a signal indicating the "end-of-exploration" cells of memory 240. All the octets which are contained in the shift registers $2163_h$ and which correspond to an additional bit in state "1," are read bit-by-bit by opening AND gate $2165_h$. As a result, the following eight word groups, such as $a_1$, . . . $A_{3,9}$, . . . $FW_1$, . . . $FW_r$, $A_{j,6}$, . . . $A_{2,13}$, . . . $FW_7$, . . . $A_{2,13}$, . . . as per FIG. 10 are delivered from the memories 252 and 240 after the aforesaid first eight groups. The free interval FI is then perhaps occupied by supervisory words in response to instructions from the switching unit 520 (FIG. 1) for reading read-and-write memory 262.

A transmission circuit $60_j$ for the multiframe formed of FIG. 10 is substantially analogous to that shown in FIG. 9. The modifications to be made are the following. The detector 631 detects the words $a_0$, $a_1$ and $FW_0$ to $FW_7$ and produces:

a first 8 kHz multiframe signal (in place of the 64 kHz clock signal); which is transmitted to the time-base 610 and to the additional bit store 653 in response to the detection of a word $a_0$;

a second signal which is transmitted to the zero-setting circuit 652; the second signal includes pulses to control the zero-resetting of the same rank bit store 660 and is derived in response to the detection of the words $a_0$, $FW_1$, . . . $FW_7$, $a_1$, $FW_1$, . . . $FW_7$, and a third signal which is fed to the AND gate 632. The third signal includes pulses at the frequency of the words received along highway 40. The pulses are at the low "0" level for the time interval which (1) lies between $a_0$ and $a_1$ and (2) corresponds to the first eight address groups. The pulses are at the high "1" level for the time interval which (1) follows the word $a_1$ and (2) corresponds to the eight address groups resulting from inverted octets. The third signal also controls AND gates (not shown) which transmit the same-rank bits from the same-rank bit store 660 to the shift registers $661_0$ to $661_{31}$. These AND gates are selected by the writing control circuit 651. Thus, first AND gates are opened by the low level pulses of the third signal from the detector 631 so as to store the non-inverted octets in the first stages of the first registers 661$_0$ to 661$_{31}$. Then, to complement the number of first gates by 32, second AND gates are opened to take the inverted octets.

It will be noted, as per FIG. 9, in relation to the multi-frame in FIGS. 7 and 10, that each of registers 661$_0$ to 661$_{31}$ includes two shift registers, each of which has 8 stages and which are adapted to a rapid content transfer from the first stages to the second stages at the multi-frame 8 kHz frequency, and that each "1" bit detector is composed of two bistable flip-flops. This makes it possible to store a multiframe whilst the preceding one is being processed in the switching circuits 695$_0$ to 695$_{31}$. In addition, this contributes, in relation to FIG. 10, to a rank-by-rank write-in of the non-periodic bits, in contrast to the read-out at 64 kHz.

Although the invention has been described with reference to preferred embodiments and with reference to words, such as octets, and incoming and outgoing multiplex channels having thrity-two component channels, variants are of course possible and can easily be devised by those skilled in the art and remain within the scope of the invention as defined in the claims appended hereto. In particular, the principle regarding bit state detection and selective bit inversion may be applied to the first embodiment as per U.S. Pat. No. 4,258,434. In the latter case, the bits in each single incoming channel are drawn together into groups having a predetermined number of bits, and each multiframe of the intermediate multiplex highway comprises framing words which relate to the rank of the bits in said groups.

While, this description refers to incoming and outgoing multiplex channels which have the same bit rate, the system can be modified to include a switching network which is adapted to switch multiplex channels having rates which are different; also integer sub-multiples of a given low rate may be devised in accordance with the invention.

It will also be noted that the switching principle of bit-by-bit is unchanged when the communications other than point-to-point (1-to-1) as envisioned in the earlier description are achieved. For example, each single incoming channel or each component channel in an incoming multiplex channel can correspond to an integral number Q of outgoing channels, in order to make multipoint connections 1 to Q.

What we claim is:

1. A time-division digital switching network for switching a plurality of incoming and outgoing isochronous digital data channels transmitting data words consisting of a given even or odd number of bits and having rates which are different but sub-multiples of a given low rate, said switching network comprising:

means for phasing said incoming digital channels;

means connected to said phasing means for adding the bits of each data word of each phased incoming channel into a sum to produce an additional bit having first and second binary states when said sum is respectively no greater and greater than half of the given bit number;

first means controlled by said adding means for selectively inverting and not inverting the bits of said data word of said phased incoming channel in response to the state of said additional bit;

means controlled by said adding means for deriving inversion indicating words, each indicating whether the bit states of each incoming channel word have or have not been inverted;

means for storing the bits having the same rank in said phase incoming channel data words;

means for detecting stored same rank bits having a predetermined binary state;

means for storing address words of said outgoing digital channels to be switched to said incoming digital channels;

means controlled by said predetermined binary state bit detecting means for reading stored outgoing channel address words corresponding to switched incoming channels with bits having said predetermined binary state and the same rank;

means for multiplexing the read outgoing channel address words and said bit inversion indicating words into an address word multiplex digital highway at high rate;

means connected to said multiplex digital highway for detecting said address words of each outgoing digital channel;

means controlled by said address word detecting means for supplying a bit having said first and second binary states to said rank of a data word of said outgoing digital channel in response to said address word of said outgoing digital channel being detected and not detected, respectively;

means connected to said intermediate digital highway for detecting said inversion indicating words for said incoming digital channel words corresponding to each outgoing digital channel to restore said additional bits; and second switching means controlled by said inversion indicating word detecting means for transmitting uninverted and inverted replicas of the bits of each data word transmitted from said supplying means to said outgoing digital channel in response to the binary state of said additional bit corresponding to said data word.

2. A time-division switching network according to claim 1 comprising:

means for producing a number of framing words equal to said given number of data word bits, each framing word being multiplexed in said multiplex digital highway to define an outgoing channel address word recurrent frame corresponding to the detection of incoming channel bits having the same rank and having said predetermined binary state after being routed through said first switching means;

means for inserting said additional bit of each word in said same rank bit storing means to transmit it to said predetermined binary state detecting means before the bits of said data word;

said inversion indicating word deriving means producing an additional framing word defining an additional frame of outgoing channel address words corresponding to the detection of the incoming channel word additional bits having said predetermined binary state; and inversion indicating word detecting means connected to said multiplex digital highway for supplying additional bits of said second and first binary states to said second switching means in response to said outgoing channel address word in said additional frame being respectively detected and not detected.

3. A time-division digital switching network according to claim 1, comprising:
   means for producing a number of framing words equal to said given number of data word bits, each framing word being multiplexed in said multiple digital highway to define an out-going channel address word recurrent frame corresponding to the detection of incoming channel bits having the same rank and having said predetermined binary state after being routed through said first switching means;
   means for controlling said reading means, firstly in response to the incoming channel word additional bits having said second binary state, then in response to the incoming channel word additional bits having said first binary state such that, in an address word frame corresponding to bits having a given rank, a first group of address words corresponding to the incoming channel bits belonging to data words for which the additional bits have a first binary value being transmitted along said multiplex digital highway after framing word of said frame and before the transmission of an inversion indicating word preceding a second group of address words corresponding to the incoming channel bits having said given rank and belonging to data words for which said additional bits have a second binary value different from said first binary value,
   said inversion indicating word detecting means supplying additional bits having said first and second binary values to said second switching means in response to detection of said outgoing channel address word in a first or second group of at least one of said frame having different ranks; and
   means for delaying each data word supplied by said delivering means to said second switching means for a time period equal to the sum of the recurrent durations.

4. A time-division digital switching network according to claim 1 comprising:
   means for deriving (a) a number of framing words equal to said given number of data word bits minus one and (b) first and second inversion indicating words respectively corresponding to additional bits having the first and second binary states;
   each multiplex digital highway multiframe including successive first and second address word parts, each of the first and second address word parts respectively including said first and second inversion indicating words followed by said predetermined number of address word groups, each corresponding to same rank bits having said second binary state after being routed through said first means and belonging to data words for which said additional bit is respectively in said first and second binary states;
   each group of an address word part being preceded by a framing word corresponding to a rank apart from said first group corresponding to the first rank that is respectively preceded by said first and second inversion indicating words; and
   means for transmitting to said predetermined binary state bit detecting means said first multiframe part along said multiplex digital highway in response firstly to the incoming channel word additional bits having said first binary state, then said second multiframe part following said first multiframe part in response to said incoming channel word additional bits having said second binary state;
   said inversion indicating word detecting means supplying additional bits respectively having said first and second binary states to said second switching means in response to the detection of said outgoing channel address word in at least one of said groups of said first and second multiframe parts; and
   means for delaying each data word supplied by said supplying means to said second switching means by a multiframe duration.

5. A time-division digital switching network according to claim 1 wherein said data word bit adding means for each phased incoming channel comprises means for counting the bits of each of said words of said phased incoming channel having said second-binary state and means for comparing the sum obtained with said given number to produce said additional bit.

6. A time-division digital switching network according to claim 1 wherein said data word bit adding means for each phased incoming channel words comprises:
   first means for counting the bits of each of said words of said phased incoming channel having said second binary state;
   second means for counting the bits of each of said words of said phased incoming channel having said first binary state; and
   means for comparing the two counts obtained to produce said additional bit.

7. A time-division digital switching network according to claim 1 wherein each of said incoming channels is an incoming component channel included in an incoming multiplex channel having a predetermined integer number of component channels, each incoming component channels capable of being switched to an outgoing component channel.

8. A time-division digital switching network according to claim 1 wherein each of said outgoing channels is an outgoing component channel included in an outgoing multiplex channel having a predetermined integer number of component channels, each incoming component channel capable of being switched to an outgoing component channel.

* * * * *